(12) United States Patent
Lalancette et al.

(10) Patent No.: US 7,500,701 B2
(45) Date of Patent: Mar. 10, 2009

(54) SEALING RING WITH IMPROVED FASTENER

(75) Inventors: Daniel Lalancette, St-Jean-sur-Richelieu (CA); Yves Boucher, St-Jean-sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 10 days.

(21) Appl. No.: 11/536,774

(22) Filed: Sep. 29, 2006

(65) Prior Publication Data
US 2007/0075553 A1   Apr. 5, 2007

Related U.S. Application Data

(60) Provisional application No. 60/722,666, filed on Sep. 30, 2005.

(51) Int. Cl.
*B65D 45/30* (2006.01)
(52) U.S. Cl. .................. 292/256.67; 292/256
(58) Field of Classification Search ............ 292/256.65, 292/256.6, 256.67; 324/156; 361/667; 24/279
See application file for complete search history.

(56) References Cited

U.S. PATENT DOCUMENTS

| 407,559 | A | * | 7/1889 | Wells ........................... 403/44 |
| 988,109 | A | | 3/1911 | Kaufmann |
| 1,179,188 | A | * | 4/1916 | Kanty .................... 292/256.67 |
| 1,268,550 | A | * | 6/1918 | Dunlap ........................ 220/320 |
| 1,929,375 | A | * | 10/1933 | Shanor et al. ............... 220/320 |
| 2,115,361 | A | * | 4/1938 | Daggett .................. 292/256.67 |
| 2,226,396 | A | * | 12/1940 | Wackman ............... 292/256.67 |
| 2,456,149 | A | | 12/1948 | Roesen |
| 2,546,276 | A | * | 3/1951 | Redding ..................... 600/549 |
| 2,715,477 | A | * | 8/1955 | North ........................ 220/320 |
| 2,968,508 | A | * | 1/1961 | Campbell et al. ...... 292/256.67 |
| 3,077,360 | A | * | 2/1963 | Israel ..................... 292/256.67 |
| 3,447,825 | A | * | 6/1969 | Santoni .................. 292/256.67 |
| 3,841,768 | A | | 10/1974 | Adams |
| 4,130,269 | A | | 12/1978 | Schreyer |
| 4,134,609 | A | * | 1/1979 | Santoni .................. 292/256.67 |
| 4,302,126 | A | | 11/1981 | Fier |
| 4,422,679 | A | | 12/1983 | Ruscitto |
| 4,531,770 | A | | 7/1985 | Mattress, Jr. |
| 4,614,451 | A | | 9/1986 | Braisted, Jr. |
| 4,675,949 | A | | 6/1987 | DaCosta |
| 4,905,353 | A | | 3/1990 | Gari |
| 5,048,881 | A | | 9/1991 | Renfro |
| 5,184,912 | A | | 2/1993 | Bowman et al. |
| 5,409,486 | A | | 4/1995 | Reese |
| 5,851,038 | A | | 12/1998 | Robinson et al. |
| 5,971,190 | A | | 10/1999 | Mannino |

(Continued)

*Primary Examiner*—Gary Estremsky
(74) *Attorney, Agent, or Firm*—Hoffmann & Baron, LLP

(57) ABSTRACT

One aspect of the present invention includes a sealing ring having a split-ring annular band which includes a first and second end. A first tab is disposed at the first end, with the first tab extending away from the annular band. The first tab also includes a first threaded aperture. A second tab is disposed at the second end, with the second tab also extending away from the annular band. The second tab also includes a second threaded aperture. Additionally, a thread of the first aperture is different from a thread of the second aperture. Further, the sealing ring includes a fastener threadedly engaged with the first and second apertures. Rotation of the fastener adjusts a radial dimension of the annular band.

24 Claims, 7 Drawing Sheets

U.S. PATENT DOCUMENTS

| | | |
|---|---|---|
| 6,488,535 B1 | 12/2002 | Robinson et al. |
| 6,497,528 B2 | 12/2002 | Hattan |
| 6,619,708 B1 | 9/2003 | Naylor |
| 2003/0227179 A1 * | 12/2003 | Mardis ................ 292/308 |

* cited by examiner

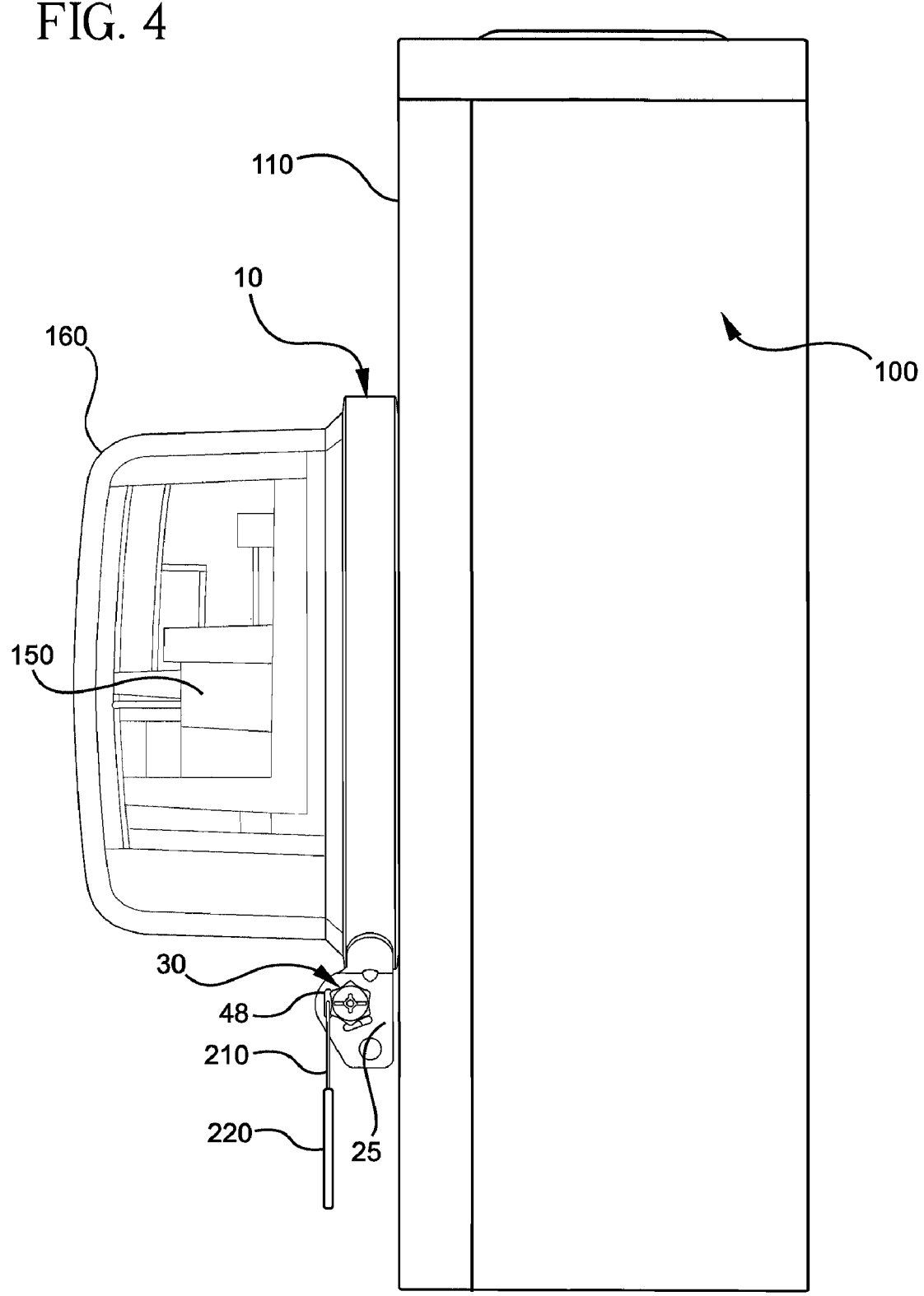

SEALING RING WITH IMPROVED FASTENER

CROSS-REFERENCE TO RELATED APPLICATIONS

This application claims the benefit of U.S. Provisional Patent Application Ser. No. 60/722,666 filed on Sep. 30, 2005.

BACKGROUND OF THE INVENTION

The present invention relates generally to a clamping device and more particularly, to sealing rings for electric watt-hour meters.

It is well understood that sealing rings have many applications. They are generally used as clamps for joining or securing cylindrical or annular surfaces. Also, they are particularly used on watt-hour meters that measure the amount of electrical consumption at a particular location, such as a residence or commercial building.

On watt-hour meters, a sealing ring is commonly used to secure the outwardly projecting electrical meter to its meter base. Although each watt-hour meter is secured in a socket in the meter base through frictional and sometimes other means of engagement, sealing rings further prevent the meter from disengaging from its base. Additionally, watt-hour meter sealing rings serve to lock the meter onto its base and prevent unauthorized tampering or removal of the meter. Typically, the meter base which is securely mounted on a wall includes an annular flange. The meter itself has a transparent cover which is provided with a similar flange that is abutted or mated to the flange on the base and they are secured together by the sealing ring.

Commonly, watt-hour meter sealing rings have a split-ring design. Once the meter cover is installed, the sealing ring is wrapped around the mating flanges and secured with a threaded bolt, screw or other fastener. Generally, a screw is used that passes through slots in a pair of tabs that extend outwardly in the radial direction and are located on the ends of the split-ring. By tightening the fastener, the tabs are brought together and the split-ring is fixed firmly to the mating flanges. Additional slots on the tabs are often provided for receiving a key or combination padlock to prevent unauthorized personnel from removing the ring seal. Further, an additional small wire security seal is commonly fixed to the screw and the sealing ring in order to deter and detect tampering.

Installation of sealing rings can be cumbersome and time consuming. Manipulating a screw through the mating tabs, while holding the assembly together, requires some precision under ideal conditions. However, many watt-hour meters are located outdoors, often covered or encroached upon by structures, conduits, cables and surrounding flora, and are difficult to access. Add to this, poor weather conditions, low lighting or uneven terrain and an otherwise relatively simple yet precise task is made difficult.

Another recognized problem is that most watt-hour meter sealing rings come preassembled and require some disassembly before they are installed. In the preassembled configuration the fastener screw is already threaded through both end tabs of the sealing ring (see FIGS. 1 and 2). However, the design of contemporary sealing rings and their fastener screws limit the split-ring aperture, without unthreading the screw from at least one mating tab. Thus, it is virtually impossible to install a contemporary sealing ring on most meters without unscrewing the screw from at least one tab before completing the installation. Thus, the installer is now made to spend additional time and effort, first to disassemble the device, before having to reassemble it for the final installation. Furthermore, upon disassembly, the screw may be dropped and/or lost rendering the device useless.

Also, in an effort to accommodate both left and right handed users, some sealing ring designs allow the fastening screw to be reversed to accommodate their preference. In other words, the screw can be threaded into the tabs from either the left or right side. However, in order to take advantage of this design the user is required to completely disassemble the device by removing the screw from both tabs, before screwing it into the opposite side and completing the reassembly, before the final installation. As discussed above, this can cause difficulties and delays in the final installation.

Yet another recognized problem is that the screw that fastens the split ring tabs is difficult to screw-in because it is positioned in the same central plane as the sealing ring itself, which abuts or is in close proximity to the meter base (See FIGS. 1 and 2). The central plane being defined by a plane in which the longitudinal center of the sealing ring band lies. This position makes it very difficult to engage fingers or tools on the screw in order to tighten it for installation, because the longitudinal axis of the screw, and thus the screw heads, is too close to the meter base.

Similar to the screw position problem discussed above, the wire security seal is also difficult to install in prior art sealing rings. In order to provide a way to secure the fastener screw to the ring seal, slots are frequently machined along the screw's axis. In this way the wire from the security seal is fed from the front of the meter toward the back of the meter through the slot and the sealing ring. However, once again the close proximity of the sealing ring with the meter base makes it difficult for the installer to weave the small security seal wire through these slots from the front toward the back of the meter and then lock into the security seal slug.

Also, traditional sealing ring assemblies use rivets to secure the support tabs to the sealing ring itself. Such rivets can be popped from a fully installed assembly and used to breach the security, which these devices claim to provide. In this way an unauthorized individual can remove the sealing ring assembly without breaking the wire security seal or adjusting the fastener screw.

Additionally, the commonly used screws are difficult to or can not be hand-tightened and often require a specific tool for tightening (as shown by FIG. 1). This causes even more difficulty during installation, as the installer must be equipped and prepared with the correct tool.

Further still, the overall prior art sealing ring designs are difficult to manufacture. The tab support structures are generally the most complex requiring intricate die-cast pieces with numerous detailed cut-outs and bends (see FIGS. 1 and 2). These designs are also difficult for an installer to manipulate or handle in the field. The lack of ergonomic holding positions combined with some sharp edges on the piece can even harm the installer.

SUMMARY OF THE INVENTION

The present invention provides a sealing ring, with particular application to watt-hour meters, which locks and secures the meter and its cover to the meter box, thus preventing or detecting unauthorized tampering or removal of the meter.

One aspect of the present invention includes a sealing ring having a split-ring annular band which includes a first and second end. A first tab is disposed at the first end, with the first tab extending away from the annular band. The first tab also includes a first threaded aperture. A second tab is disposed at the second end, with the second tab also extending away from the annular band The second tab also includes a second threaded aperture. Additionally, a thread of the first aperture is different from a thread of the second aperture. Further, the sealing ring includes a fastener threadedly engaged with the first and second apertures. Rotation of the fastener adjusts a radial dimension of the annular band.

Additionally, the sealing ring can include a thread of the first aperture which is reversed from the thread of the second aperture. The tabs on the sealing ring can be secured to the annular band in a tamper-resistant manner. Also, at least one of the first and second tabs can include at least one tab slot for receiving a security device. Similarly, the fastener can include a radially protruding portion, wherein the protruding portion includes at least one slot passing therethrough. The fastener can be adjusted so that at least one fastener slot aligns with at least one tab slot. Further, the fastener can include a radially protruding portion in the form of a wheel disposed between the first and second tabs. Further still, the wheel can include at least one slot and the slot can align with at least one tab slot on the first and/or second tabs.

Additionally, the fastener of the sealing ring can include at least one ergonomic feature for facilitating the adjustment of the sealing ring. One such ergonomic feature is provided by at least one head on the fastener having an ergonomic shape. Another such ergonomic feature is provided by an offset between a longitudinal axis of the fastener and a central plane of the annular band, wherein a longitudinal center of the annular band lies in the central plane. Thus, the longitudinal axis of the fastener is disposed outside the central plane of the annular band. In this way the annular band can include a front portion defined by a first edge and a rear portion defined by an opposed second edge, and the fastener is disposed closer to the front portion than the rear portion. Yet another ergonomic feature is provided by including heads on opposed ends of the fastener for use by either left or right-handed users. Also, a user can engage both opposed fastener heads, such as with two hands, to facilitate adjustment of the assembly.

Yet a further aspect of the present invention includes a sealing ring for an electric watt-hour meter, wherein the sealing ring includes a split-ring annular band having a first and second end. A first tab is disposed at the first end with the first tab extending away from the annular band and including a first threaded aperture A second tab is disposed at the second end with the second tab extending away from the annular band and including a second threaded aperture. A fastener is threadedly engaged with the first and second threaded apertures, wherein a first portion of the fastener is threaded in the opposite direction from a second portion of the fastener.

Additionally, at least one of the first and second tabs can include at least one tab slot for receiving a security device. Also, the fastener can include a radially protruding portion with at least one slot passing therethrough. The fastener slot can be made to align with a tab slot. The radially protruding portion is preferably disposed between the first and second tabs and can include at least one slot adapted to align with the tab slot. Further, the fastener can include at least one ergonomic feature for facilitating the adjustment of the sealing ring.

Yet a further aspect of the present invention includes a method of securing a sealing ring on an electric watt-hour meter. The method includes providing a sealing ring, such as the improved sealing ring of the present invention described above. Also, the method includes positioning the improved sealing ring on an electric watt-hour meter. Thereafter, the fastener is rotated thereby securing the sealing ring to the meter. Additionally, a security device can be mounted on the sealing ring, with the security device passing through the tab and fastener slots.

These and other objectives, features, and advantages of this invention will become apparent from the following detailed description of illustrative embodiments thereof, which is to be read in connection with the accompanying drawings.

BRIEF DESCRIPTION OF THE DRAWINGS

FIG. 4 is a side view of the sealing ring shown in FIG. 3.

DETAILED DESCRIPTION OF THE PREFERRED EMBODIMENTS

The present invention, as shown in FIGS. 3 through 8, demonstrates a clamping device in the form of a sealing ring assembly embodying the basic principles and concepts of the present invention. It should be noted that although these figures are directed to the preferred embodiment, other applications of the instant invention are anticipated, as discussed more fully below.

Figure 1:
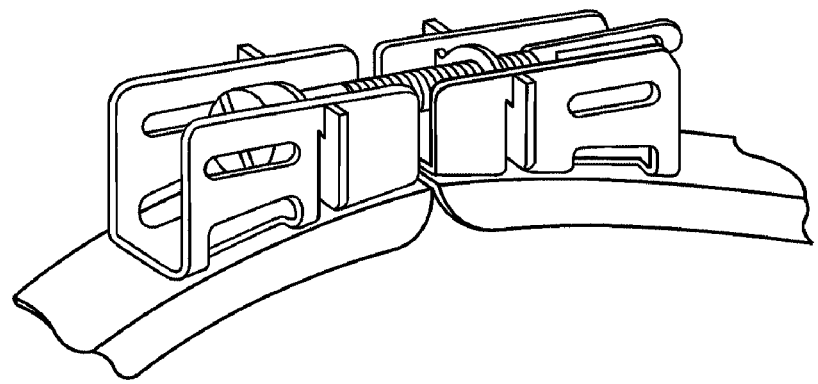
FIG. 1 is a perspective view of a prior art sealing ring.
Figure 2:
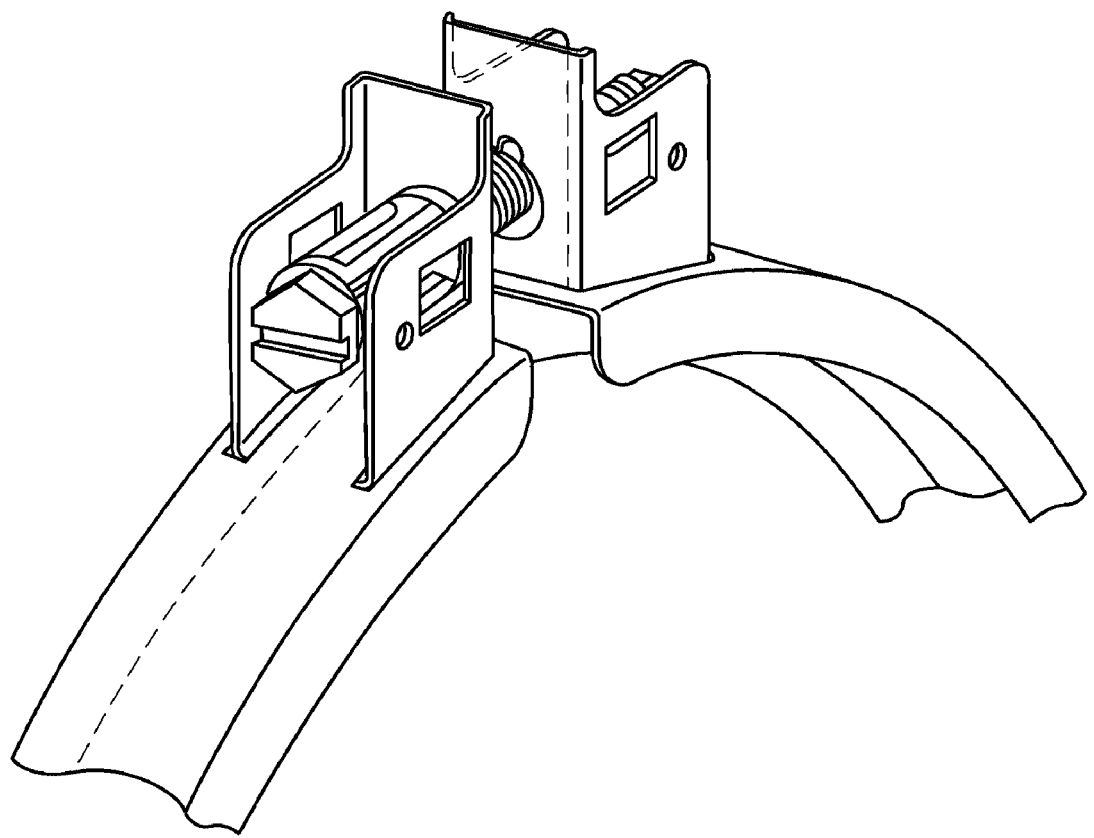
FIG. 2 is a perspective view of another prior art sealing ring.
Figure 3:
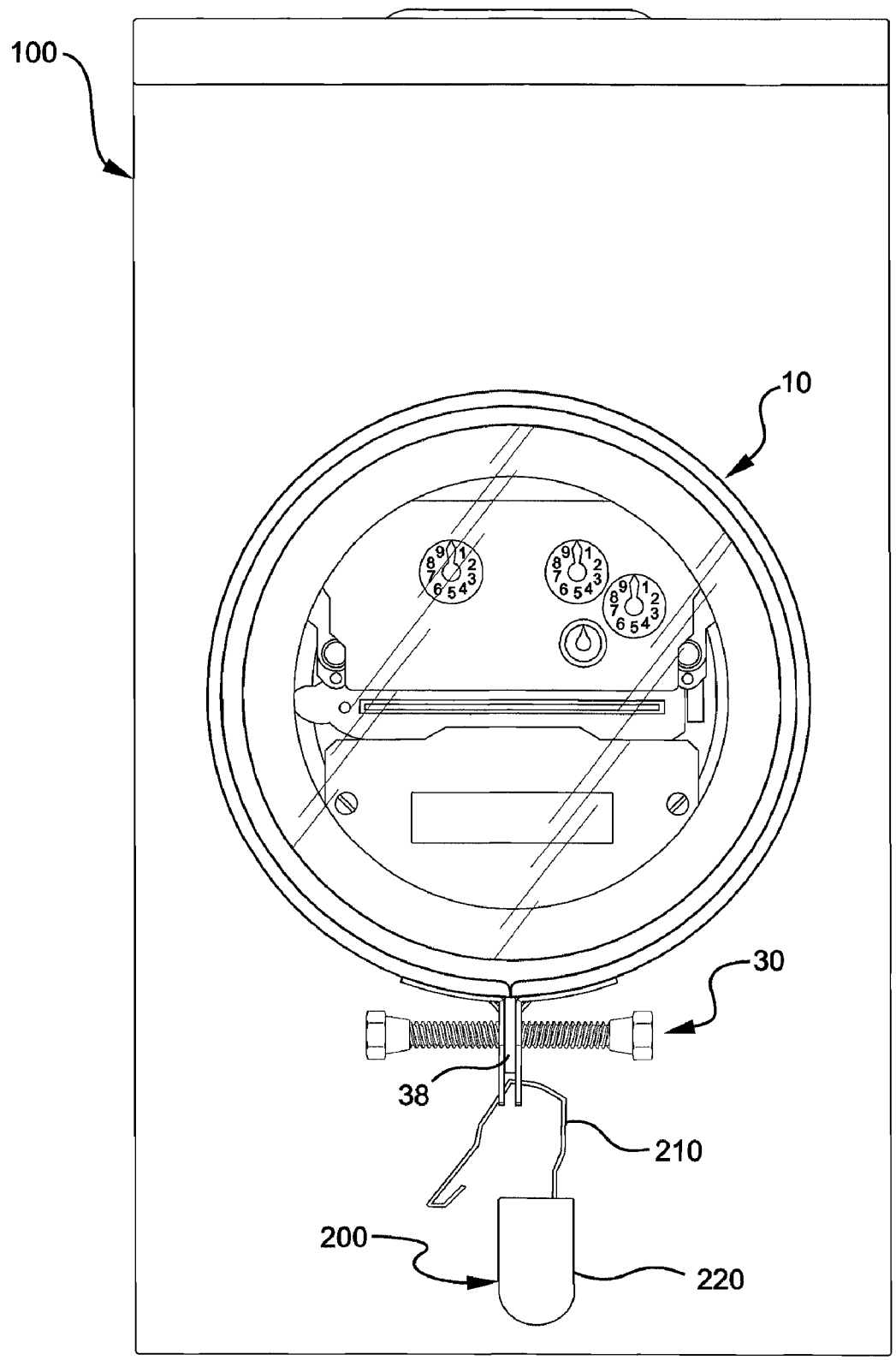
FIG. 3 is a front view of the sealing ring fastened on a meter box according to one aspect of the instant invention.

FIGS. 3 and 4 show a front view and a side view, respectively, of the instant sealing ring assembly 10 installed on a watt-hour meter assembly 100. The actual meter 150 is shown inside the meter cover 160 that is mated to the meter base 110 of the meter box. The sealing ring assembly 10 of the instant invention is shown joining and securing the meter cover 160 to the meter base 110.

FIGS. 3 and 4 also show that the wire security seal 200 has its wire 210 fed through one of the slots 46, 47, 48, 49 in each support tab 20, 25 as well as through one of the slots 39 in the center fastener wheel 38, although the wire is shown not fully engaged with the security slug 220. Also, FIGS. 3 and 4 show the sealing ring of the present invention in its fully closed position. It should be noted, however, that many watt-hour meters and their meter boxes have annular mating flanges, where the sealing ring is applied, with larger circumferences than those shown. Thus, when applied to a larger circumference meter, the support tabs 20, 25 in the present invention would not touch the center fastener wheel 38 as shown, yet still be sufficiently closed to secure the meter and permit suitable locks and security seals to be applied.

Figure 5A:
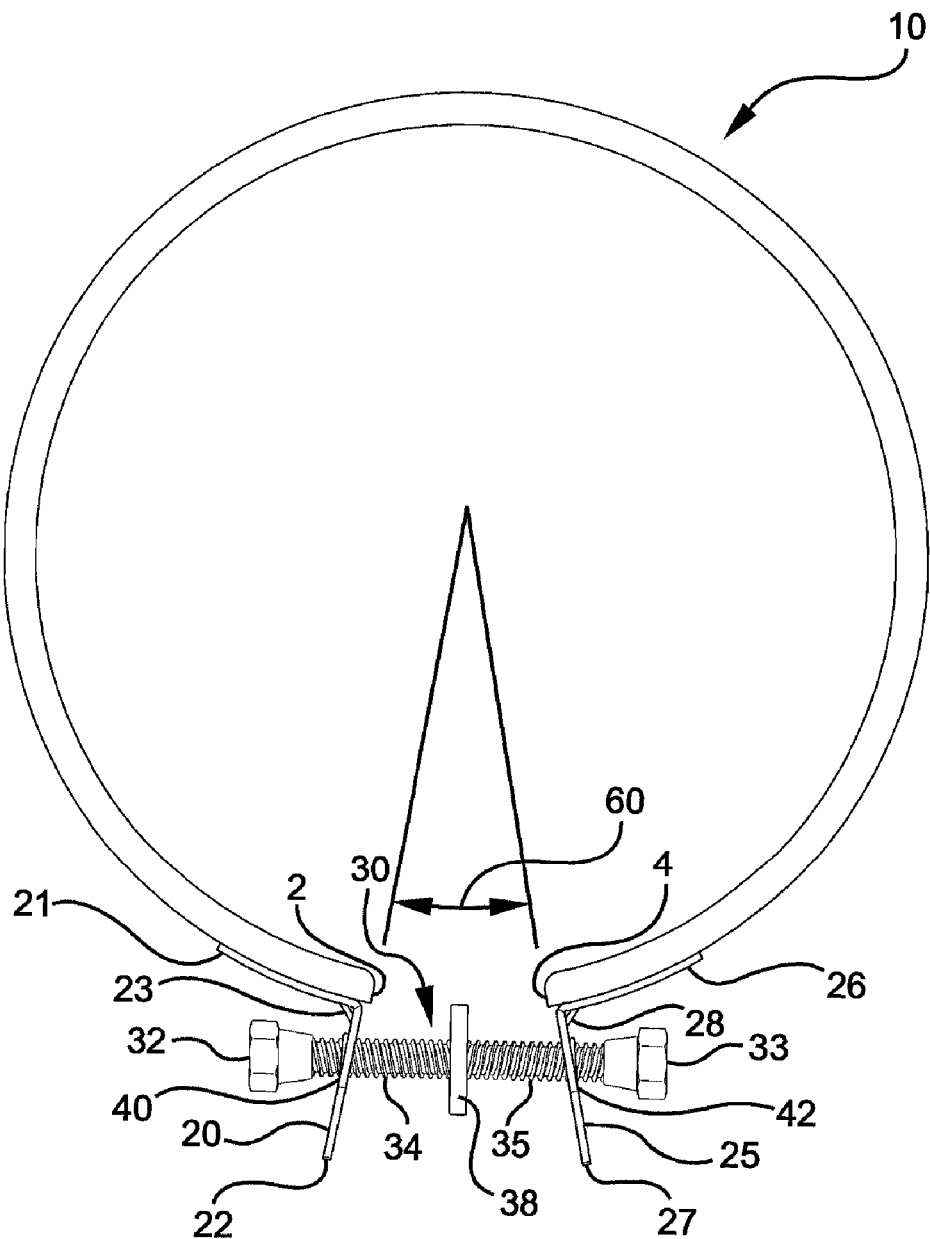
FIGS. 5*a*, 5*b*, and 5*c* are respectively front, bottom and sides views of the sealing ring according to one aspect of the instant invention in one of its open positions.
Figure 5B:
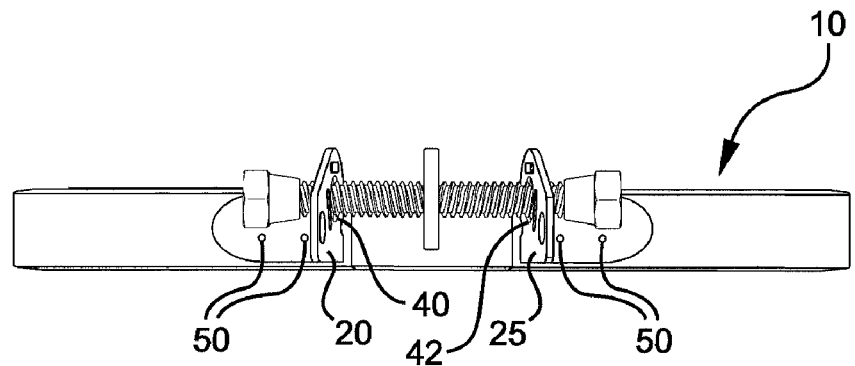
Figure 5C:
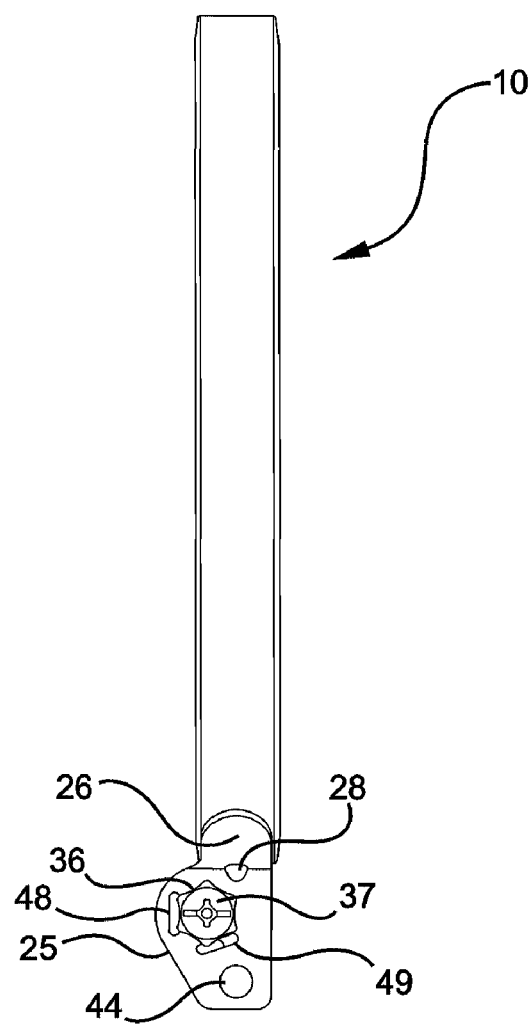

FIGS. 5*a*, 5*b* and 5*c* show the instant sealing ring assembly from various angles and in an open position. The sealing ring assembly 10 has a split-ring design formed by an annular band with open ends 2, 4. Disposed at or near each open end 2, 4 is a support tab 20, 25. These support tabs 20, 25 generally have an L-shaped design with one leg 21, 26 attached to the sealing ring band 11 and the other leg 22, 27 protruding radially outward or extending away from the annular band at the open ends 2, 4. Although the support tabs 20, 25 are described as being generally L-shaped, the attached legs 21, 26 have a curved configuration adapted to mate with and correspond to the curvature of the sealing ring band 11. The support tabs 20, 25 are generally comprised of a flat material stamped into a desired shape or bent into the described configuration. The bend in each tab includes a small crimp 23, 28 that protrudes from the bend in order to provide structural reinforcement to each tab 20, 25. The flat material construction of the support tabs 20, 25 makes them easy to manufacture. Also, the simple design provides smooth protruding surfaces and curved surfaces that make the overall sealing ring assembly both easier and safer to transport, manipulate and install.

Also shown are the various features of the fastening screw 30 of the present invention. In particular, the screw is double threaded, i.e., one side of the screw 34 is preferably threaded in the opposite or reversed direction as the other side of the screw 35, as shown in FIGS. 5a and 5b. While it is understood that the thread on each side of the screw 34 could have other differences (not shown), having threaded portions that are opposite to one another provides symmetry. Situated in the middle of the screw 30 and directly in between the two different threads 34, 35, is a center fastener wheel 38. The center fastener wheel 38 is preferably rotationally fixed relative to the fastening screw 30. The fastener wheel 38 is used to receive the wire 210 from the wire security seal 200, which is also received by at least two of the support tab slots 46, 47, 48, 49. Therefore, by fixing the fastener wheel 38 relative to the support tab slots 46, 47, 48, 49, the fastening screw 30 is also secured. As discussed previously, the sealing ring need not be fully closed to accomplish its stated function to secure the meter to its base.

The double threaded screw 30 also allows a user to close the sealing ring assembly in half the number of fastening screw 30 turns as the prior art. This is accomplished because a turn of the fastening screw 30 draws both support tabs 20, 25 toward one another, as opposed to just one tab being drawn toward the other. In other words, both support tabs 20, 25 move along the fastening screw 30 when it is turned.

Further, at the opposed ends of the fastening screw 30 are the screw heads 32, 33. The screw heads 32, 33 are specifically designed to accommodate many different fastening tools. The end face 37 of the screw head 32 includes slots or recesses to accommodate standard, Philips-head and/or Robertson-head screwdrivers. Furthermore, the outer perimeter of each screw head 32, 33 is also designed with a hexagonal head to accommodate wrenches and nut drivers. The preferred embodiment provides ½" hexagonal heads, while also providing concave surfaces 36 that allow the screw heads to be easily gripped by fingers. It is also understood that these screw heads 32, 33 could be designed to accommodate any tool as would be understood by those skilled in the art. Alternatively, a tool specific for use with this sealing ring may be made commonly available to installers. Further, the opposed and symmetric configuration of the screw heads 32, 33 provides ease of use for either right or left-handed users, without requiring disassembly. Further still, the double-headed fastener 30 allows a user to simultaneously apply a hand to each of the screw heads 32, 33, providing more leverage to accomplish the task. The screw heads also prevent the sealing ring assembly 10 from being disabled. Accordingly, there is no chance that an installer could drop or lose the screw.

Figure 6A:
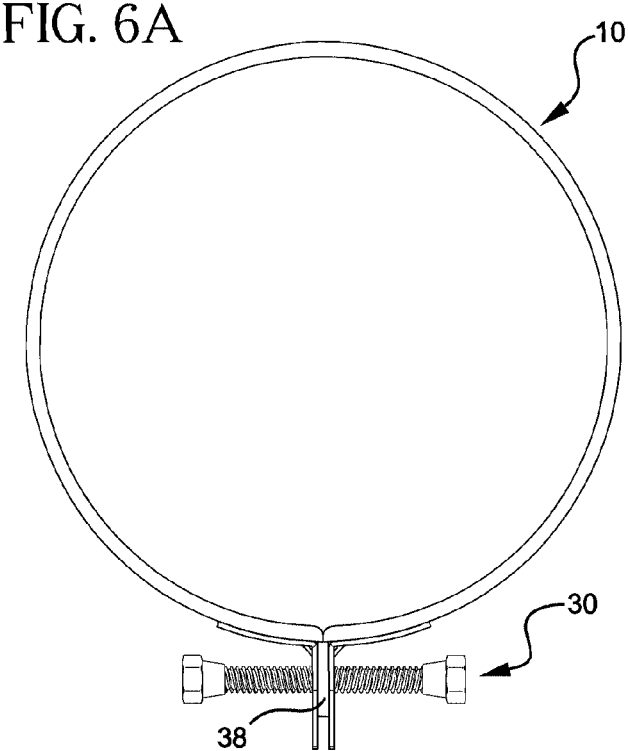
FIGS. 6*a*, 6*b*, and 6*c* are respectively front, bottom and sides views of the sealing ring according to one aspect of the instant invention in a fully closed position.
Figure 6B:
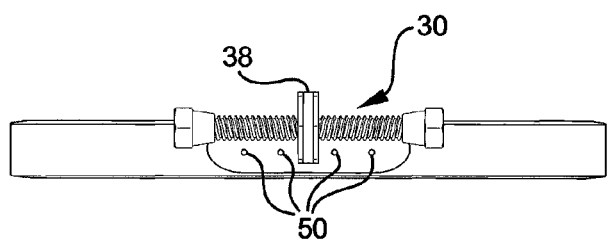
Figure 6C:
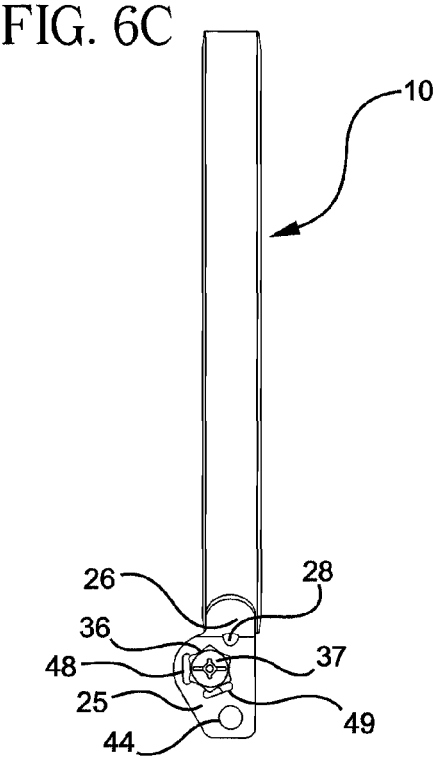
Figure 7:
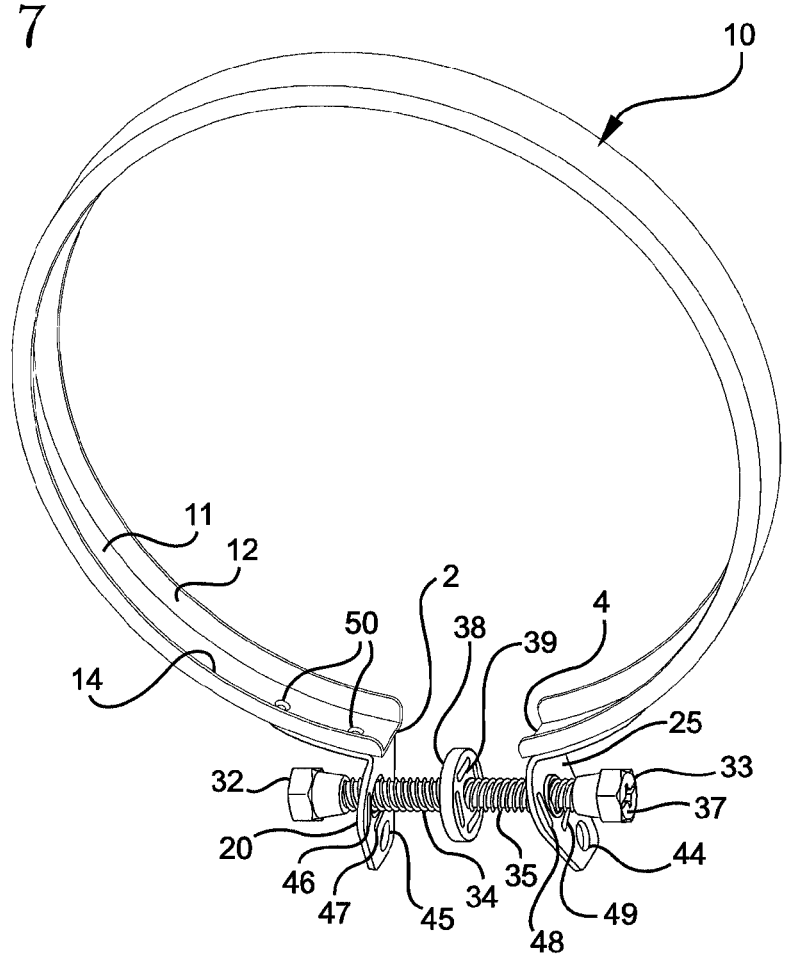
FIG. 7 is a perspective view of the sealing ring shown in FIGS. 5*a*, 5*b* and 5*c*.

The support tabs 20, 25 are provided with various holes and/or slots. The threaded portions 34, 35 of the fastening screw 30 are engaged through the threaded punched-out holes 40, 42 in each support tab 20, 25. FIGS. 5b, 5c, 6b and 6c best illustrate the offset position of the fastening screw 30. Specifically, the axial position of the fastening screw and the corresponding punched-out holes 40, 42 is spaced away from the front of the meter box base 110 making the fastening screw 30 easier to manipulate. As shown in FIG. 7, the sealing ring 10 includes a generally flat annular band portion 11. A longitudinal center of the annular band 11 extends between the two opposed ring flanges 12, 14 disposed at front and rear edges, respectively, of the annular band 11. The longitudinal center of the annular band 11 lies in a central radial plane of the annular band. Thus, by positioning the longitudinal axis of the fastening screw 30 forward of the central radial plane in a direction away from the intended meter box side of the sealing ring 10, creates an offset which makes the fastening screw 30 more easy to turn. As shown in FIGS. 5c and 6c, the axial center of the fastening screw 30 is closer to the front than the rear portion of the sealing ring 10.

Also, at least two different slots 46, 47, 48, 49 are provided on each support tab 20, 25, to accommodate the wire 210 from a wire security seal 200. Additionally, padlock holes 44, 45 are provided to accommodate a key, combination or other locking device, to secure the assembly after it has been installed. These padlock holes 44, 45 are easily accessible and can accommodate a wide range of commonly available locks and the like. Also, the purpose of these holes 44, 45 is readily apparent to users, which can remind them to apply a lock before leaving the site.

The sealing ring of the instant invention, as seen in FIGS. 5a, 5b and 5c, is capable of being opened to a relatively large aperture angle 60 without having to disassemble the structure. In the preferred embodiment of the present invention, the aperture angle 60 can reach approximately 24° in order to allow the sealing ring assembly to be installed on even the largest standard residential or commercial watt-hour meters. FIGS. 6a, 6b and 6c show the same ring assembly in the fully closed position. In the fully closed position, the aperture angle 60 is reduced to approximately zero.

FIG. 7 shows a perspective view of the sealing ring assembly according to one aspect of the instant invention. This perspective emphasizes the structure of the sealing ring assembly 10 itself. The sealing ring assembly 10 is comprised of a flat annular band 11 that has a split-ring configuration. Two ring flanges 12, 14 that extend inwardly in the radial direction on opposed axial sides of the band 11. The two ring flanges 12, 14 are integrally joined to the flat annular band 11 and are used to engage the mating annular flanges of the watt-hour meter cover 160 and meter base 110.

As illustrated in FIG. 7, spot-welds 50 preferably join the lower legs 21, 26 of the support tabs 20, 25 to the flat annular band 11. Although spot-welds are used in the preferred embodiment shown, it is obvious that numerous other means of fastening these structures are known in the art, such as riveting, screwing, using adhesives or the like. Preferably, the present invention uses spot-welds for added security. As shown in FIGS. 5a and 6a, the spot-welds do not visibly protrude through the support tab legs 21, 26, i.e., they are flush with support tab. Spot-welds make the assembly more difficult to open without damaging the flat annular band 11 in which they are embedded. Similar to the function of the wire security seal 200 the use of spot-welds make it more difficult to tamper with the assembly without leaving behind evidence of such tampering, providing an added layer of security.

As illustrated in FIG. 7, the center fastener wheel 38 includes four elongated axial slots 39. It should be understood that additional or fewer slots 39 could be provided. In fact, only one properly sized and oriented slot 39 is needed to receive the wire 210 from a wire security seal 200. The elongated slots are provided so that a portion of a slot 39 is axially aligned with a slot 46, 47, 48, 49 in each support tab 20, 25. Within a quarter turn of the fastener screw 30 at least one of the slots 39 can be fully aligned with a pair of opposed support tab slots, i.e., aligned with slots 46, 48 or slots 47, 49. Aligning the support tab slots 46, 47, 48, 49 with a fastener wheel slots 39, allows for lateral installation of the wire security seal 200, which is easier than a front-to-back installation. Once installed, a wire security seal 200 will prevent the fastening screw 30 from being turned substantially, relative to the support tabs 20, 25, thus preventing removal of the sealing ring. Alternatively, some or all slots 39 could be different from one another. Further, the slots 39 could have almost any shape, provided they still ensure the desired security function.

Figure 8A:
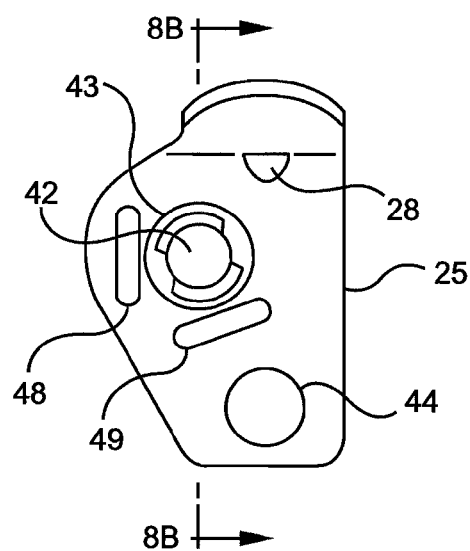
FIG. 8*a* is an enlarged side view of a support tab, without the tightening screw, according to one aspect of the instant invention.
Figure 8B:
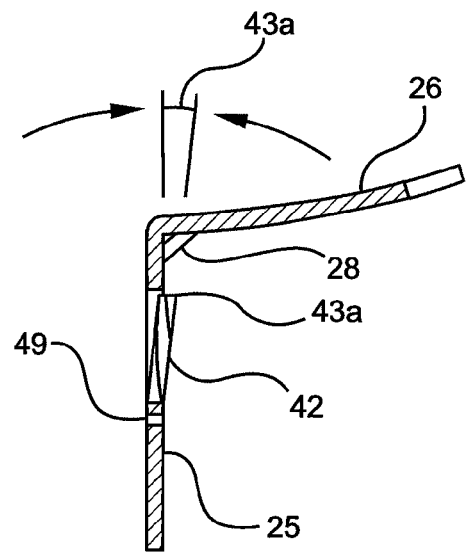
FIG. 8*b* is a cross-sectional view generally taken along line A-A in FIG. 8*a*.

Further details of the support tabs 20, 25 are illustrated in FIGS. 8*a* and 8*b*. In particular, the extent of the support crimp 28 is more clearly visible. Also, additional detail is demonstrated with regard to the punched-out holes 40, 42 which accommodate the screw fastener 30. Specifically, the punched-out holes 40, 42 include female threads 43 that are designed to mate with the male threads 34, 35 of fastener 30. Thus, as with the two oppositely threaded portions of the fastening screw 30, each support tab punch-out hole 40, 42 is threaded differently from the other. Preferably, the punch-out holes 40, 42 are threaded in a reversed or opposite configuration to one another in order to mate with the opposed configuration of the fastener screw threads 34, 35. Thus, with each turn of the fastening screw 30, the support tabs 20, 25 are simultaneously made to traverse or advance on each side of the fastening screw 30. During this movement along the axis of the fastening screw 30, the angle of each support tab 20, 25 changes relative to the fastening screw 30. In order to accommodate this change in relative angle between the fastening screw 30 and the support tabs 20, 25, the threads of the punched-out holes and screw fastener are made to have different thread angles. In the preferred embodiment, the male threads on the fastening screw 30 have about a 29° angle, and the female threads on the support tabs 20, 25 have about a 41° angle. In this way, in the wide open position (see FIGS. 5*a*, 5*b*, and 5*c*) the male and female threads are mating on one side of the threading filets, but when in the fully closed position (see, FIGS. 6*a*, 6*b*, and 6*c*) the male and female threads are mating on the opposite side of the threading filets as will be understood by those skilled in the art. Additionally, in order not to make the male threads 34, 35 too thin, the punched-out holes 43 protrude at an angle 43*a* relative to the support tabs. As shown in FIG. 8*b*, punched-out angle 43*a* is about 6° in the preferred embodiment. This combination of angles from the fastening screw threads 34, 35, the support tab threads 43 and the punched-out hole angles 43*a*, enables the sealing ring of the present invention to open wide enough to accommodate most common watt-hour meters without requiring sealing ring disassembly as well as provide a fastening mechanism which provides less resistance to move from the open position to the closed position. While certain angles have been described with respect to the preferred embodiments, those skilled in the art will recognize that other angles are possible to accomplish the stated functions without departing from the scope and spirit of the invention.

The present invention is compatible with all watt-hour meters that conform to the standards set by both the National Electric Manufacturers Association (NEMA) and the Canadian Standards Association (CSA). Thus, they can be easily introduced into the market without the need to change the already installed equipment or the meters already sold and not yet installed. Moreover, the sealing ring of the present invention provides the advantages of ease of manufacture, ease of use without fear of loss of component parts, less force required on the fastener assembly to install, a single integral unit, and an overall improved and safer device for the installer.

The sealing ring of the present invention is easier and quicker to install. The present sealing ring avoids the need to disassemble the fastener screw prior to installation. Also, the present invention provides a larger fully assembled split-ring open position, allowing users to slip the assembled sealing ring onto the meter cover and meter box before tightening. Further, the present invention provides two symmetrically opposed fastener screw heads, making the assembly just as easy to tighten for both left and right-handed individuals. Furthermore, a left-handed user does not need to disassemble the present invention in order to facilitate assembly. Further still, using two hands on both fastener heads allows a user to tighten the sealing ring of the present invention more quickly than those previously known, thus making the sealing ring easier to hand-tighten. The double threaded design allows rotation of the fastener to more quickly adjust the overall sealing ring. Also, the fastener heads are preferably made to receive a plurality of standard tools for adjusting the screws or bolts. Additionally, the screw heads are unobstructed making them easier to access by hand or with a tool.

Also, the sealing ring of the present invention provides support tabs that are spot-welded to the sealing ring for added security by making it more difficult to tamper with the assembly without noticeably and irreparably damaging the sealing ring. Further, the present invention provides a sealing ring with a simple design that is easier for users to handle and manipulate safely. Yet further, the present invention provides a sealing ring that can be applied and used on most existing watt-hour meters.

It will also be understood by those skilled in the art that the sealing ring assembly can be used for various applications and is not limited to sealing an electric meter to its base. Similarly, the fastening mechanism of the present invention will be understood by those skilled in the art to be capable of use on various applications including, but not limited to, many different types of clamping devices.

While the invention has been described in connection with one or more embodiments, it is to be understood that the specific mechanisms and techniques which have been described or shown are for illustrative purposes only to provide a basic understanding of the invention, and that many modifications may be made to the invention described without deviating from the scope of the invention. Thus, the scope of the invention should be determined by the appended claims and their legal equivalents, rather than by the examples given.

What is claimed is:

1. A sealing ring comprising,
a split-ring annular band having a first end and a second end;
a first tab disposed at said first end, said first tab extending away from said annular band, said first tab including a first aperture and a first aperture threading;
a second tab disposed at said second end, said second tab extending away from said annular band, said second tab including a second aperture and a second aperture threading, wherein said first aperture threading is reversed from said second aperture threading, wherein at least one of said first and second tabs includes at least one tab slot for receiving a security device; and
a fastener threadedly engaged with said first aperture threading and said second aperture threading, said fastener including at least one head for rotating said fastener, said head disposed at an axial end of said fastener, whereby rotation of said head adjusts a radial dimension of said annular band, said fastener including a radially protruding portion disposed between said first and second tabs, said radially protruding portion including at least one opening for engaging said security device.

2. A sealing ring as defined in claim 1, wherein said at least one head includes two heads each disposed at opposed ends of said fastener.

3. A sealing ring as defined in claim 1, wherein both of said first and second tabs include at least one tab slot for receiving a security device.

4. A sealing ring as defined in claim 1, wherein said opening includes at least one fastener slot passing through said radially protruding portion, said at least one fastener slot being adapted to align with said at least one tab slot.

5. A sealing ring as defined in claim 1, wherein said tabs are secured to said annular band by fastening means, wherein said fastening means do not visibly protrude from said first and second tabs.

6. A sealing ring as defined in claim 4, wherein said at least one fastener slot extends through the radially protruding portion substantially parallel to a longitudinal axis of said fastener.

7. A sealing ring as defined in claim 6, wherein said at least one tab slot includes at least two separate tab slots on one of said first and second tabs.

8. A sealing ring as defined in claim 4, wherein said at least one fastener slot includes at least two fastener slots.

9. A sealing ring as defined in claim 1, wherein said fastener includes at least one ergonomic feature for facilitating the adjustment of said sealing ring.

10. A sealing ring as defined in claim 9, wherein said at least one ergonomic feature is disposed on said head, wherein said head is ergonomically-shaped.

11. A sealing ring as defined in claim 9, said at least one ergonomic feature includes a longitudinal axis of said fastener being disposed outside a central plane of said annular band, wherein a longitudinal center of said annular band lies in said central plane.

12. A sealing ring as defined in claim 1, wherein said annular band includes a first edge and an opposed second edge, wherein each of said edges extend substantially the entire length of said annular band, and a longitudinal length of said fastener is disposed substantially in a common plane with said first edge.

13. An electric watt-hour meter sealing ring, said sealing ring comprising,
a split-ring annular band having a first end and a second end;
a first tab disposed at said first end, said first tab extending radially outwardly from said annular band, said first tab including a first threaded aperture;
a second tab disposed at said second end, said second tab extending radially outwardly from said annular band, said second tab including a second threaded aperture, at least one of said first and second tabs including at least one portion for retaining a security device; and
a fastener threadedly engaged with said first and second threaded apertures, wherein a first portion of said fastener is threaded in the opposite direction from a second portion of said fastener, said fastener including at least one head for rotating said fastener, said head disposed at an axial end of said fastener, said fastener including a radially protruding portion disposed between said first and second tabs, said radially protruding portion including at least one opening for engaging said security device, wherein upon installation of said security device rotation of said fastener being limited by engagement of at least a portion of said opening and said security device.

14. A sealing ring as defined in claim 13, wherein said at least one portion for retaining a security device includes at least one tab slot passing through said at least one first and second tabs.

15. A sealing ring as defined in claim 14, wherein said opening includes at least one fastener slot adapted to align with said at least one tab slot.

16. A sealing ring as defined in claim 13, wherein said security device can pass through both said opening and said at least one security device retaining portion in a direction substantially parallel to a longitudinal axis of said fastener.

17. A sealing ring as defined in claim 13, wherein said head includes at least one ergonomic feature for facilitating the adjustment of said sealing ring.

18. A sealing ring as defined in claim 13, wherein both said first and second tabs include at least one portion for retaining a security device.

19. A sealing ring as defined in claim 13, wherein said at least one opening includes at least two separate openings each passing completely through said radially protruding portion.

20. A method of securing a sealing ring on an electric watt-hour meter comprising,
providing a sealing ring including,
a split-ring annular band having a first end and a second end,
a first tab disposed at said first end, said first tab extending away from said annular band, said first tab including a first threaded aperture,
a second tab disposed at said second end, said second tab extending away from said annular band, said second tab including a second threaded aperture, wherein a thread of said first aperture is different from a thread of said second aperture, wherein at least one of said first and second tabs includes at least one security device retaining portion and
a fastener threadedly engaged with said first and second apertures, said fastener including at least one head for rotating said fastener, said head disposed at an axial end of said fastener, whereby rotation of said head adjusts a radial dimension of said annular band, said fastener including a radially protruding portion disposed between said first and second tabs, said radially protruding portion including at least one security device engagement opening;
positioning said sealing ring on an electric watt-hour meter; and
rotating said head thereby aligning said at least one security device retaining portion and said at least one security device engagement opening securing said sealing ring to said meter.

21. A method of securing a sealing ring, as defined by claim 20, wherein at least one of said security device retaining portions includes at least one tab slot for receiving said security device.

22. A method of securing a sealing ring, as defined by claim 21, further comprising:
mounting a security device on said sealing ring, said security device passing through said at least one tab slots and said at least one security device engagement opening.

23. A method of securing a sealing ring, as defined by claim 22, wherein said security device passes through both said at least one tab slots and said at least one security device engagement opening in a direction substantially parallel to a longitudinal axis of said fastener.

24. A method of securing a sealing ring, as defined by claim 22, wherein said security device passes through at least two of said tab slots and said fastener engagement opening.

* * * * *